Patented June 27, 1950

2,513,268

UNITED STATES PATENT OFFICE 2,513,268

GLASS FIBER-RESIN COMPOSITE PRODUCT

Robert Steinman, Newark, Ohio, assignor to Owens-Corning Fiberglas Corporation, a corporation of Delaware No Drawing. Application December 30, 1944, Serial No. 570,795

1 Claim. (Cl. 117—126)

The present invention relates to manufactures of fibrous glass combined with resinous material or plastics.

One of the more promising of the class of resinous materials reinforced with fibrous glass is the combination of low-pressure and contact forming or curing resins with glass fiber cloth, fabric, webs and mats. In the manufacture of these products, the mats, webs or cloths are impregnated with the resinous material and then cured under heat or pressure or both depending upon the nature of the resinous material. Ordinarily the fibrous glass is present in a plurality of layers or lamina but the glass fibers may in certain instances be heterogeneously dispersed throughout the resin or plastic body by working a mass of loose relatively short fibers into the uncured resin.

The low-pressure and contact resins used in conjunction with glass fiber cloths, webs, or mats are especially desirable for producing large articles. The low pressure required by the resins during curing is ample to compact the fibrous glass material, and even in the cases of the contact forming resins, where no pressure is required during curing, a plurality of superposed fibrous glass cloths or webs lie compactly together to provide a satisfactorily dense finished product. Because of this, very simple molds or forms are usable for shaping glass reinforced plastics, which in turn greatly facilitates the manufacture of large structural and other members from this material.

There are several types of low-pressure and contact forming thermosetting resins adapted to various uses, and to all of which the present invention is applicable. More particularly, these resins include the allyl type resins, that is, those resins having an allyl group or groups as at least one of the polymerizing constitutents, styrene copolymers, and allyl derivative copolymers. An example of a resinous material of the type described is diallyl phthalate. These are all low molecular weight, unsaturated materials that are capable of polymerizing to infusible materials, i. e., are thermosetting.

While the invention is especially intended for glass fiber reinforced plastics, it is usable in other products where fibrous glass is combined with resinous materials, for example, in the manufacture of coated cloths or fabrics. For such products, fabrics of interwoven or intermatted fibrous glass are impregnated and coated with synthetic resins and resin compounds. In the manufacture of these products the polymers are ordinarily applied to the fabric by means of doctor blades or rollers or by being run through a bath of the polymer in liquid state, and then the impregnated fabric calendered or treated in other conventional manner.

Resinous materials are also combined with glass fibers in the form of yarns or strands, the fibers, yarns or strands being coated with the material to bind the fibers together in the strand, to protect the fiber surfaces in the strands or yarns against mutual abrasion, and for similar purposes, as for providing a film on the fiber surfaces capable of being dyed. In the latter instance, the dye or pigment may be combined with the polymer prior to application of the polymer to the fiber surfaces or the fibers coated with resinous materials may be dyed following conventional procedure.

In these composite articles, where resinous materials are combined with glass fibers, it is necessary to achieve a high degree of adhesion between the fiber surfaces and the resin if fully satisfactory products are to be realized. But due to the basically different natures of the glass and the resinous materials the two oftentimes form a relatively easily separable inter-bond.

This lack of proper adhesion between the fibers and the resin detracts materially from the properties of the composite product. For instance, the strength, the moisture resistance and the useful life of glass fiber reinforced plastics all suffer from the limited adhesion between the resins and the fibers.

It is an object of the present invention to increase the adhesion of resins, especially low-pressure and contact forming resins, to glass fibers to improve the properties of glass fiber-synthetic resin composite products.

It is a further object to improve the adhesion of these resinous materials to glass fibers by employing in conjunction with the materials additive substances that promote adhesion when present in such small quantities that the other properties of the resin are not altered.

It is a still further object to employ adhesion-promoting substances that may be added either to the resinous material or to the glass fiber surfaces prior to the application of the resin to the fibers, thereby providing flexibility in the procedure.

More specifically, it is an object of the invention to provide as an adhesion-promoting agent, substances capable of polymerizing with the resin and reacting with the glass surfaces of the fibers to create a secure interbond between these dissimilar materials.

The present invention provides for increasing the adhesion between resinous materials and glass fiber surfaces by incorporating in the composite material a substance or substances which are effective to promote a strong bond between the resinous materials and the fibers. These substances are effective when present in very small proportions so that the favorable properties of the resin are not perceptibly altered. Also the additive substances are effective whether admixed with a resin or applied as a pretreatment to the fibers, to permit added flexibility in use of the substances.

The objects of the present invention are accomplished by employing in the composite material small amounts of silicate derivatives of allyl alcohol of the general formula:

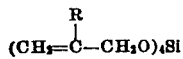

where R is a monovalent group capable of attachment to carbon, such as a hydrogen atom illustrated by allyl silicate, an alkyl group in β methallyl silicate, an aryl group in β phenylallyl silicate, and a halogen group, as in β chloroallyl silicate.

Generally the silicate derivatives of these materials are prepared by reaction of the alcohol with silicon tetrachloride,

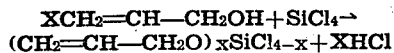

where X=1, 2, 3, or 4, or by reaction of the alcohol with an alkyl orthosilicate, for example, ethyl orthosilicate,

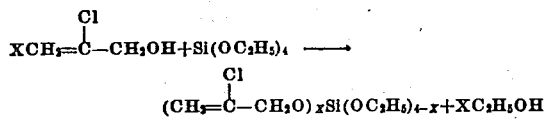

As previously mentioned, the materials of the present invention are added either to the resin prior to its application to the glass fibers or the glass fiber fabrics, or are applied in the manner of applying sizing to the fibers or fabrics prior to the application of the resin. The materials are effective when present in very small amounts and are usually required in proportions ranging from about .1% to 1% by weight of the resin. The practice of the present invention is further illustrated by the following examples.

*Example A*

Allymer CR-39-BD resin (an unsaturated polyester with a polymerizable allyl radical) has added about .5% of allyl silicate prior to its application to glass fiber cloth. The resin with the additive therein is then applied in the conventional manner to the cloth and a number of layers of the cloth are built up to form a laminate of the required thickness. The superposed layers of resin impregnated cloth are then heated while being held under pressure of about 10 to 25 pounds per square inch to cure the resin.

Laminates produced in this way show improvements in flexure strength of up to 25%, and in compression strength of up to 30%. Water adsorption was reduced on an average of about 25%.

*Example B*

Glass fiber cloth was after-treated by being dipped in a 3% solution of methallyl silicate in xylene and then air dried to remove the solvent. The treated cloth was then impregnated with Laminac X-4000 resin (a thermosetting styrene copolymer), and then built up in a laminate of desired thickness. After curing under heat and pressure in the conventional manner, tests showed improvements in compression strength and flexural strength as good as and in some cases better than those obtained where the silicate derivative was added to the resin prior to impregnation of the cloth.

Other silicate derivatives may be substituted for those mentioned in the preceding examples, for instance, β-phenylallyl silicate, β-chloroallyl silicate, and the like.

The improvements experienced by practice of the present invention are believed due, at least in part, to the fact that the unsaturated silicates are capable of co-polymerizing with the resin to become in effect one with the resin surrounding the fiber surfaces. They also are believed to react by hydrolysis with the glass surfaces to be anchored securely to the fibers.

Various modifications may be made within the spirit of the invention and the scope of the claim.

I claim:

A product of manufacture comprising a continuous body of diallyl phthalate resin having a multiplicity of glass fibers distributed therethrough to reinforce the body, said resin having distributed therein a small amount of methallyl silicate.

ROBERT STEINMAN.

REFERENCES CITED

The following references are of record in the file of this patent:

UNITED STATES PATENTS

| Number | Name | Date |
|---|---|---|
| 2,215,048 | McGregor | Sept. 17, 1940 |
| 2,308,495 | D'Alelio | Jan. 19, 1943 |
| 2,311,613 | Slayter | Feb. 16, 1943 |
| 2,320,536 | Pollack | June 1, 1943 |
| 2,322,310 | Muskat | June 22, 1943 |
| 2,394,642 | Strain | Feb. 12, 1946 |
| 2,409,633 | Kropa | Oct. 22, 1946 |